United States Patent
Kim et al.

(10) Patent No.: US 8,198,614 B2
(45) Date of Patent: Jun. 12, 2012

(54) TERAHERTZ WAVE GENERATOR AND METHOD OF GENERATING HIGH-POWER TERAHERTZ WAVES USING THE SAME

(75) Inventors: Jae Hun Kim, Seoul (KR); Seok Lee, Seoul (KR); Deok Ha Woo, Seoul (KR); Sun Ho Kim, Seoul (KR); Young Tae Byun, Guri (KR); Young Min Jhon, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 216 days.

(21) Appl. No.: 12/641,006

(22) Filed: Dec. 17, 2009

(65) Prior Publication Data

US 2011/0031417 A1    Feb. 10, 2011

(30) Foreign Application Priority Data

Aug. 6, 2009    (KR) .................. 10-2009-0072426

(51) Int. Cl.
    *G21K 5/02*    (2006.01)
(52) U.S. Cl. .................. 250/504 R; 250/492.2; 315/248
(58) Field of Classification Search .............. 250/504 R
    See application file for complete search history.

(56) References Cited

U.S. PATENT DOCUMENTS

| | | | | |
|---|---|---|---|---|
| 3,325,740 A | * | 6/1967 | Davy | 327/123 |
| 3,860,854 A | * | 1/1975 | Hollister | 315/248 |
| 4,645,340 A | * | 2/1987 | Graham et al. | 356/301 |
| 6,791,270 B2 | * | 9/2004 | Kim et al. | 315/39 |
| 2007/0262730 A1 | * | 11/2007 | Ogasawara et al. | 315/248 |

OTHER PUBLICATIONS

Xu Xie et al., "Coherent Control of THz Wave Generation in Ambient Air," Physical Review Letters, Feb. 24, 2006, pp. 075005-1-075005-4, PRL 96, 075005(2006), 2006 The American Physical Society, New York USA.
H. Hamster et al., "Short-pulse terahertz radiation from high-intensity-laser-produced plasmas," Physical Review E, Jan. 1994, pp. 671-678, vol. 49, No. 1, 1994 The American Physical Society, California USA.
Meng-Ku Chen et al., "Terahertz generation in multiple laser-induced air plasmas," Applied Physics Letters, Dec. 9, 2008, pp. 231102-1-231102-3, 2008 The American Physical Society, Pennsylvania USA.

* cited by examiner

*Primary Examiner* — Phillip A Johnston
(74) *Attorney, Agent, or Firm* — LRK Patent Law Firm

(57) ABSTRACT

The present invention relates to a terahertz wave generator and a method of generating high-power terahertz waves using the terahertz wave generator. The terahertz wave generator includes a hollow spherical body, and a focusing lens installed in a cutout portion of the spherical body or an opening formed in the cutout portion, wherein an inner surface of the spherical body is coated with metal. In the method, frequencies having different levels are incident through the focusing lens or the opening to generate a plurality of air plasmas, and the air plasmas cause continuous focusing the metal-coated inner surface and hollow space of the spherical body, thus generating high-power terahertz waves. According to the present invention, a plurality of air plasmas is continuously generated, thus solving the problem in which the light intensity of terahertz waves generated using one air plasma is low.

12 Claims, 4 Drawing Sheets

TERAHERTZ WAVE GENERATOR AND METHOD OF GENERATING HIGH-POWER TERAHERTZ WAVES USING THE SAME

BACKGROUND OF THE INVENTION

1. Field of the Invention

The present invention relates generally to a terahertz wave generator and a method of generating high-power terahertz waves using the terahertz wave generator. More particularly, the present invention relates to a terahertz wave generator implemented using a hollow spherical body and a method of generating high-power terahertz waves using a plurality of air plasmas in the terahertz wave generator.

2. Description of the Related Art

Terahertz waves denote signals which fall within a frequency range from 0.1 to 10 THz, which equal to a wavelength band from 0.03 to 3 mm. Currently, terahertz waves are widely used in biology, chemistry, national defense, environmental detection, security, and communication, etc. As the generation of coherent terahertz waves (THz waves) becomes possible due to the use of stabilized femtosecond (1fs=$10^{-15}$ seconds) optical pulses and the recent excellent results of engineering such as material engineering, new research fields different from the flow of millimeter wave or sub-millimeter wave engineering, originating from previous microwave engineering, or typical far-infrared spectroscopy, have been developed.

Terahertz waves can be generated in such ways that are to emit wideband pulse-shaped terahertz (THz) light from a material excited using an ultra-short pulse laser, to use the acceleration of electrons in a photoconductive antenna, to use a nonlinear effect in electro-optic crystals, or to use plasma oscillation.

An ultra-fast pulse laser light can be radiated onto a GaAs or InP semiconductor which is a photoconductor (so that photonic energy is greater than the band gap of a material), and thus electron-hole pairs are generated. When a bias electric field of ~10 V/cm is applied to such a semiconductor, free electrons and holes are accelerated, and thus photoelectric current is produced. At this time, the accelerated electrons produce THz light. A THz pulse generation device is configured such that a divided antenna is manufactured on a semiconductor substrate to form switches, and such that, when a dc bias is applied to both ends of the antenna and ultra-fast laser pulses (<100 fs) are condensed onto an antenna gap, electrons cross the gap at high speed, and thus the current of the antenna enables THz pulses to be generated. A THz pulse light source using a photoconductor has low output power, but generates stabilized and coherent beams. Accordingly, such a THz pulse light source is used in high-resolution Time Domain Spectroscopy (TDS), and exhibits excellent Signal/Noise Ratio (SNR) in THz imaging technology.

The generation of THz light using the nonlinear effect of an electro-optic crystal is intended to generate THz pulses using the nonlinear effect of a crystal such as GaAs or ZnTe produced when an ultra-fast pulse laser radiates light onto such a crystal. That is, the nonlinear effect in which an incident beam having a frequency of win is divided into two beams respectively having low frequencies of $\omega out1$ and $\omega out2$ is exhibited ($\omega in = \omega out1 + \omega out2$). Frequencies $\omega out1$ and $\omega out2$ undergo into optical rectification process to generate THz light. This method has low efficiency, but is advantageous in that it has a wide bandwidth.

Efficient THz wave generation methods are divided into methods using optical rectification based on an $x^{(2)}$ process, and methods using four-wave mixing based on an $x^{(3)}$ process. THz wave generation methods based on an $x^{(2)}$ process may include methods using optical media such as Zinc telluride (ZnTe), Cadmium telluride (CdTe), and c-cut Diethylaminosulfur trifluoride (DAST), each having strong $x^{(2)}$ characteristics. In addition, methods using gas or liquid are also widely known. When femtosecond optical pulses are propagated into an electro-photo crystal having a high $x^{(2)}$ value, THz pulse waves of about 1 cycle are generated while forming a Cerenkov circle, owing to optical rectification. That is, when femtosecond laser pulses are radiated onto the surface of a semiconductor on which a surface electric field is formed, carriers (electrons and holes) excited by the laser are accelerated because of the electric field on the surface of the semiconductor, and thus a current (called 'surge current') flows and a THz pulse wave is generated. InP or GaAs is a semiconductor having a large surface electric field. Such a semiconductor simultaneously radiates THz pulse waves generated by the optical rectification of an incident optical pulse obtained based on a secondary nonlinear optical effect occurring near the surface, that is, $x^{(2)}$ processing.

Further, a representative method based on an $x^{(3)}$ process may be a method using air plasma. The generation of a terahertz wave using air plasma was first posted in 1994 in a publication (H. Hamster, A. Sullivan, S. Gordon, R. Falcone, Phys. Rev. E 49, 671 (1994)). However, it is well known that the light intensity of a terahertz wave is very low, and that the conversion ratio, at which a focused laser beam is converted into a terahertz wave, is very low. In order to solve these problems, methods of increasing light intensity by generating two or more air plasmas were proposed in a plurality of publications (X. Xie, J. Dai, X.-C. Zhang, Phys. Rev. Lett. 96, 075005 (2006) and M.-K. Chen, J H. Kim, C.-E. Yang, S. S. Yin, R. Hui, P. Ruffin, Appl. Phys. Lett. 93, 231102 (2008)). However, the experimental schemes proposed in the above publications are disadvantageous because whenever one air plasma is generated in the case where a plurality of air plasmas is generated, a pair of parabolic mirrors is added, and thus an increase in cost attributable to the addition of parabolic mirrors is very high. Further, when one air plasma is additionally generated, the additionally required space is relatively large.

Therefore, there is required an apparatus and method which uses air plasma based on an $x^{(3)}$ process, but can generate high-power terahertz waves by generating a plurality of air plasmas in a narrow space without requiring additional parabolic mirrors.

SUMMARY OF THE INVENTION

Accordingly, the present invention has been made in consideration of the problem mentioned above that the conventional terahertz wave generation method based on an $x^{(3)}$ process requires additional space and a pair of parabolic mirrors to generate additional air plasma and terahertz wave, and an object of the present invention is to provide a terahertz wave generator, which is capable of generating high-power terahertz waves by generating a plurality of air plasmas in a narrow space without requiring additional parabolic mirrors, and a method of generating high-power terahertz waves using the terahertz wave generator.

In order to accomplish the above object, the present invention provides a terahertz wave generator, comprising a hollow spherical body, and a focusing lens installed in a predetermined cutout portion of the spherical body or an opening formed in the predetermined cutout portion of the spherical body, wherein an inner surface of the spherical body is coated with metal (capable of reflecting light signals ranging from visible rays to terahertz waves), and also provides a method of generating high-power terahertz waves which is configured such that two frequencies having different levels are incident through the focusing lens or the opening to generate a plurality of air plasmas, and the air plasmas cause continuous focusing the metal-coated inner surface and hollow space of the spherical body, thus generating high-power terahertz waves.

According to the present invention, a plurality of air plasmas is continuously generated, thus solving the problem in which the light intensity of terahertz waves generated using one air plasma is low.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Figure 1:
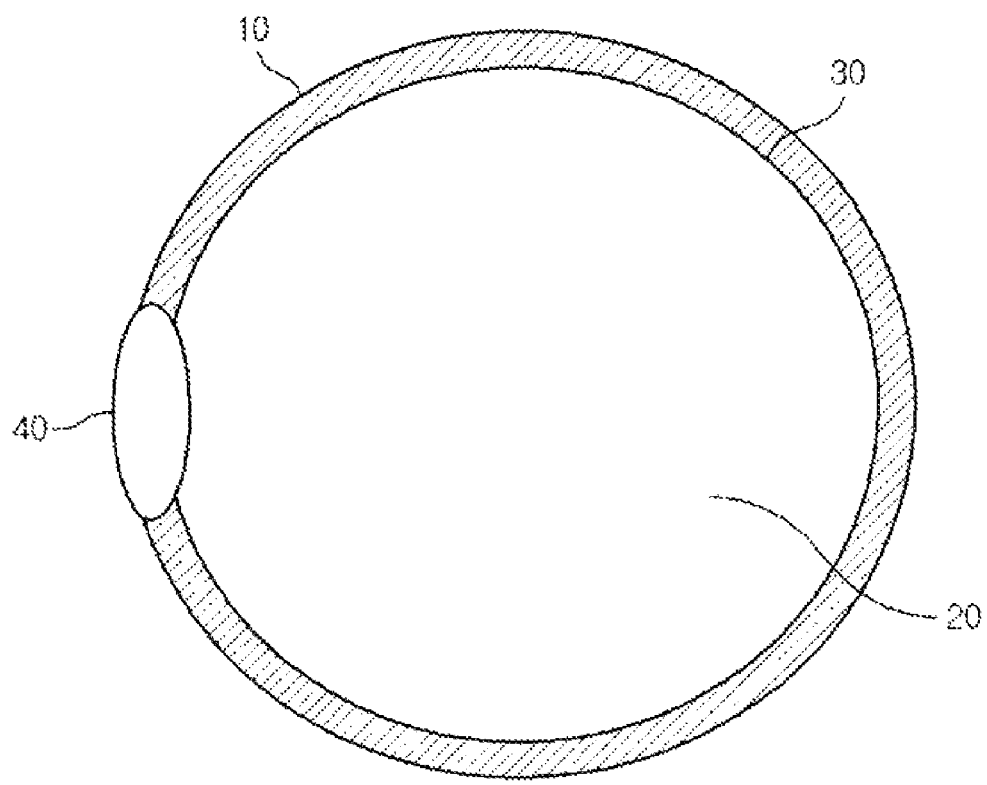
FIG. 1 is a sectional view showing an embodiment of a terahertz wave generator according to the present invention.

FIG. 1 is a diagram showing the schematic construction of a terahertz wave generator for generating terahertz waves using a plurality of air plasmas according to an embodiment of the present invention. As shown in the drawing, the terahertz wave generator according to the present invention includes a spherical body 10, the inside of which is a hollow space 20, and a focusing lens 40 installed in a predetermined cutout portion of the spherical body 10 after the predetermined portion of the spherical body 10 is cut out. Further, the spherical body has an inner surface 30 coated with metal. The inner surface 30 of the spherical body 10 is preferably coated with aluminum, for example.

On the other hand, when the spherical body 10 of the present invention is made of metal, the terahertz wave generator according to the present invention can be implemented without the inner surface 30 of the spherical body 10 being separately coated with metal.

In the terahertz wave generator according to the present invention, continuous focusing and collimating is performed using the hollow space 20 of the spherical body 10 having the inner surface 30 coated with aluminum (or one of any other kind of metal material capable of reflecting light signals ranging from visible rays to terahertz waves), and thus high-power terahertz waves can be generated by a plurality of air plasmas.

In another embodiment of the present invention, the terahertz wave generator according to the present invention can be implemented even using a spherical body 10 having an opening in a portion at which the focusing lens 40 can be installed, without the focusing lens 40 being actually installed in the terahertz wave generator of FIG. 1. In this case, two light signals having different frequencies, which have been collimated, are incident into the spherical body 10 through the opening thereof and are collimated in the hollow space 20 of the spherical body 10. While the two light signals are reflected from the inner surface 30 coated with metal and are then focused, an air plasma is generated. When the air plasma undergoes a reaction, terahertz waves are generated. The above procedures such as the reflection of light signals from the inner surface 30 and the collimation and focusing of the light signals are repeated, a plurality of air plasmas can be generated.

Figure 2:
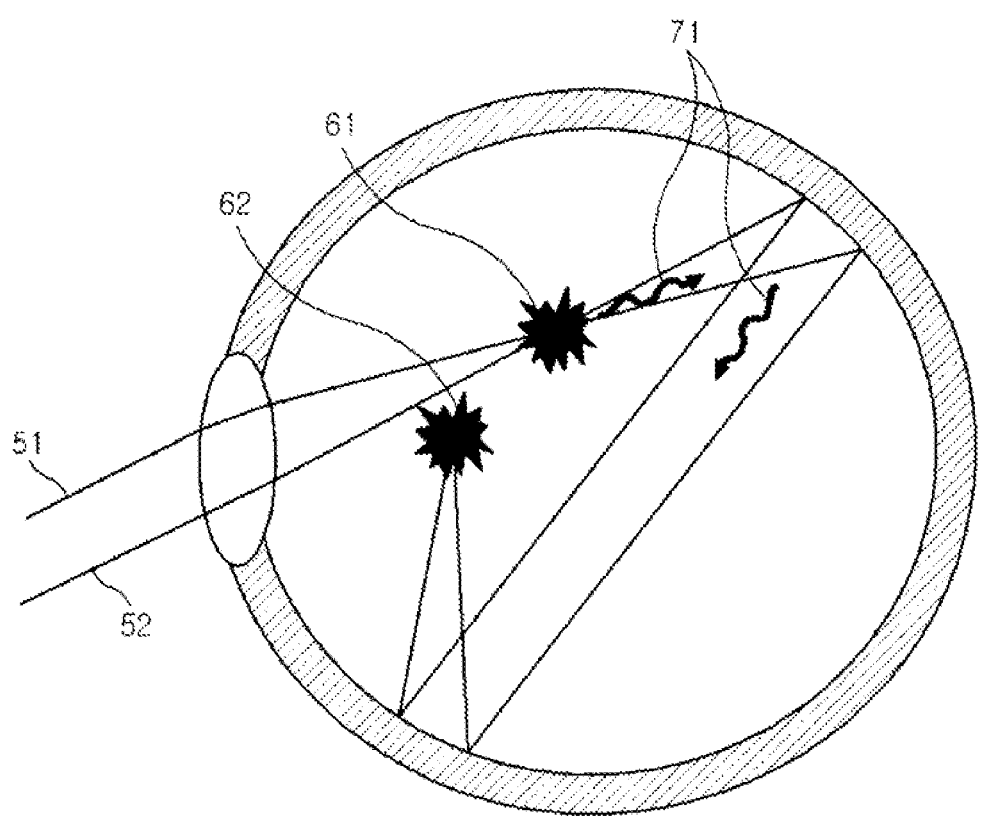
FIG. 2 is a diagram showing a process for generating initial terahertz waves according to an embodiment of the present invention.

FIG. 2 is a diagram showing a process for generating initial air plasma and terahertz waves in the terahertz wave generator according to the present invention.

As shown in FIG. 2, two light signals 51 and 52 having photon frequencies of $\omega$ and $2\omega$ are incident into the terahertz wave generator of the present invention after passing through the focusing lens 40 thereof. As the two light signals pass through the focusing lens 40, they are focused, and then the first air plasma 61 is generated. When the first air plasma 61 undergoes a reaction, first terahertz waves 71 are generated. Thereafter, the first terahertz wave 71 moves in the hollow space 20 of the spherical, body 10 together with the two light signals 51 and 52 having frequencies of $\omega$ and $2\omega$. The continuously traveling light signals 51 and 52 are reflected from the metal-coated inner surface 30 of the spherical body 10, are collimated, and are then focused in the hollow space 20. As a result, the second air plasma 62 is generated.

The two light signals 51 and 52, which are initially incident into the hollow space 20 of the spherical body 10 of the terahertz wave generator according to the present invention, are generated by the following procedure. The $\omega$ frequency light signal 51, which is an original signal, is incident on a beta-BaB2O4 (BBO) or lithium triborate (LBO or LiB3O5) crystal, so that Second Harmonic Generation (SHG) is caused, and thus the $2\omega$ frequency light signal 52 is generated. The generated $2\omega$ frequency light signal 52, together with the original $\omega$ frequency light signal 51, are incident into the hollow space 20 after passing through the focusing lens 40 of the terahertz wave generator according to the present invention.

The generation of terahertz waves using the air plasma which was generated in and underwent a reaction in the hollow space 20 of the terahertz wave generator according to the present invention, is based on four-wave mixing and is represented by the following Equation (1) (refer to: M.-K. Chen, J H. Kim, C.-E. Yang, S. S. Yin, R. Hui, P. Ruffin, Appl. Phys. Lett. 93, 231102 (2008).), $$E_{THz} \propto \chi^{(3)} E_{2\omega}^{*2} \sin(\phi),$$

where $E_{THz}$ denotes the light intensity of the generated terahertz waves, $E_\omega$ and $E_{2\omega}$ denote the light intensities of the two light signals 51 and 52 having frequencies of $\omega$ and $2\omega$, and $\phi$ denotes the difference between the phases of the two light signals 51 and 52 having frequencies of $\omega$ and $2\omega$. That is, it can be seen that, when the above Equation (1) is converted into an equation of four-wave mixing, terahertz waves are generated by the following Equation (2), $$\omega_{THz} = \omega + \omega - 2\omega \qquad (2)$$

When the second air plasma 62 undergoes a reaction, the terahertz waves are generated and are superposed on the first terahertz waves 71, and thus second terahertz waves are generated.

Figure 3:
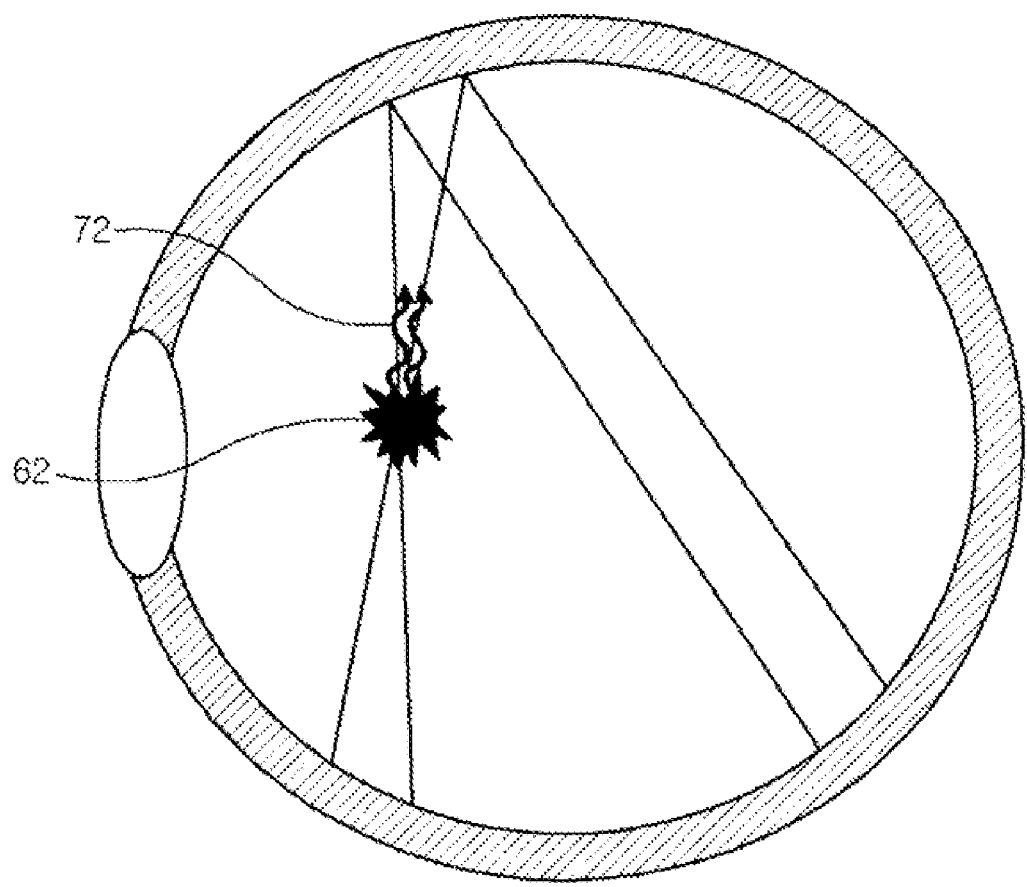
FIG. 3 is a diagram showing a process for continuously generating terahertz waves subsequently to the process of FIG. 2.

FIG. 3 is a diagram showing a process for generating second terahertz waves, subsequently to the generation of the initial air plasma in the terahertz wave generator according to the present invention.

As shown in FIG. 3, while two light signals 51 and 52 having frequencies of ω and 2ω are collimated in the hollow space 20 of the spherical body 10, they are reflected from the inner surface 30 and are again focused, and thus the second air plasma 62 is generated. When the second air plasma undergoes a reaction, second terahertz waves are generated and are superposed on the first terahertz waves 71, and thus first superposed terahertz waves 72 are generated.

Figure 4:
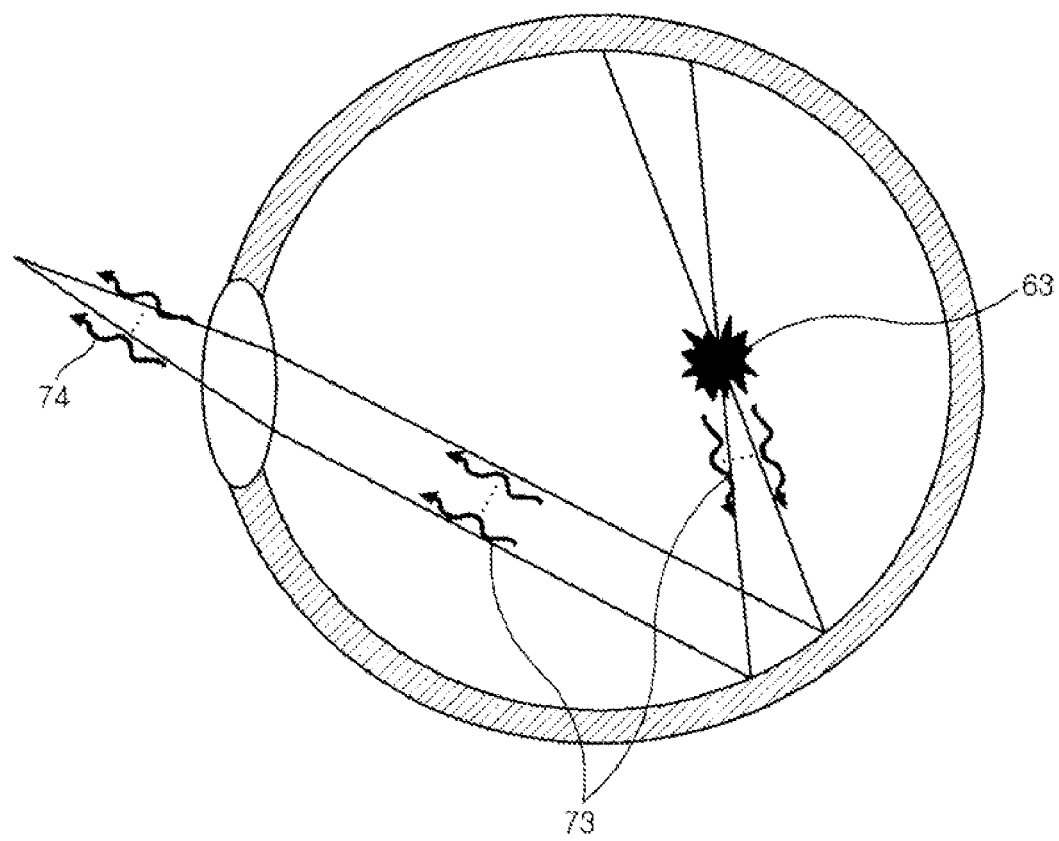
FIG. 4 is a diagram showing a process for generating high-power terahertz waves by generating a plurality of plasmas according to the present invention.

FIG. 4 is a diagram showing a process for continuously performing the generation of air plasma and terahertz waves of FIG. 3 in the terahertz wave generator of the present invention.

As shown FIG. 4, it can be seen that an N-th air plasma 63 is generated by the continuous reflection, focusing and collimation of the light signals 51 and 52 having the frequencies of ω and 2ω and that N−1-th superposed terahertz waves 73, which are generated by superposing the N-th terahertz waves, generated when air plasma undergoes a reaction, on N−2 superposed terahertz waves, are output through the focusing lens 40, and thus high-power terahertz waves 74 in the results of superposition from the first to N-th terahertz waves are generated.

In the embodiment of the present invention, incidence angles of the two light signals 51 and 52 having frequencies of ω and 2ω, which are incident through the focusing lens 40, are adjusted, so that the number of air plasmas generated in the hollow space 20 of the terahertz wave generator according to the present invention can be controlled. Therefore, the intensity of the output terahertz waves can be controlled.

For reference, preferred embodiments disclosed in the present specification have been selected as the most preferable embodiments from among various possible embodiments and have been presented, for easy understanding by those skilled in the art. It is apparent that the technical spirit of the present invention is not necessarily limited or restricted to the above embodiments, and that various modifications, additions and substitutions are possible, and other equivalent embodiments are also possible, without departing from the scope and spirit of the invention. For example, it is apparent that the present invention includes various embodiments related to a construction in which a plurality of air plasmas is generated while the focusing, collimation and reflection of two light signals incident through the focusing lens are repeated, and construction in which the number of times air plasmas are generated can be controlled by adjusting the incidence angles of the light signals that are incident through the focusing lens.

According to the present invention, there is provided technology for generating terahertz waves using a plurality of air plasmas. The present invention is configured such that continuous focusing of light signals is performed using a hollow spherical space, the inner surface of which is coated with aluminum (or one of any kind of metal material capable of reflecting light signals ranging from visible rays to terahertz waves), so that high-power terahertz signals can be generated by a plurality of air plasmas. Further, in order to overcome the problem of the light intensity of terahertz waves decreasing when one air plasma is used, air plasmas are continuously generated in the present invention, and thus the problem of low light intensity can be solved. Furthermore, unlike a conventional method using a plurality of air plasmas, the present invention does not require additional parabolic mirrors, and can generate high-power terahertz waves using only a single spherical hollow space, which has no spatial restrictions and the inner surface of which is coated with aluminum (or one of any other kind of metal material capable of reflecting light signals ranging visible rays to terahertz waves).

What is claimed is:

1. A terahertz wave generator, comprising:
   a spherical body, an inside of which is hollow space, the spherical body having an inner surface coated with metal or made of metal; and
   any one of a focusing lens, installed in a predetermined portion of the spherical body and interposed between an outer surface and the hollow space of the spherical body, and an opening of a predetermined size formed after a predetermined portion of the spherical body is cut out,
   wherein light signals incident through the focusing lens or the opening are focused and collimated in the hollow space of the spherical body and are reflected from an inner surface of the spherical body, so that a plurality of air plasmas is generated, and a plurality of terahertz waves, generated when the air plasmas undergo a reaction, are superposed on one another, and thus high-power terahertz waves are generated.

2. The terahertz wave generator according to claim 1, wherein the metal is aluminum or one of any metal material capable of reflecting light signals ranging from visible rays to terahertz waves.

3. The terahertz wave generator according to claim 1, wherein a number of air plasmas generated in the hollow space of the spherical body is controlled by adjusting incidence angles of the light signals that are incident through the focusing lens or the opening.

4. The terahertz wave generator according to claim 1, wherein:
   the light signals are two light signals having a frequency of ω and a frequency of 2ω; and
   the light signal having the frequency of 2ω is generated by Second Harmonic Generation (SHG) occurring when femtosecond laser light having a frequency of ω is applied to a beta-$BaB_2O_4$ (BBO) or a lithium triborate ($LiB_3O_5$ or LBO) crystal.

5. A method of generating high-power terahertz waves using a terahertz wave generator in which an inside of a spherical body is hollow space, an inner surface of the spherical body is made of metal or coated with metal, and a focusing lens or an opening is formed in a predetermined portion of the spherical body, the method comprising:
   allowing light signals to be incident through the focusing lens or the opening;
   focusing or collimating the incident light signals in the hollow space of the spherical body;
   generating a first air plasma from the focused light signals;
   generating first terahertz waves when the first air plasma undergoes a reaction;
   collimating the light signals in the hollow space of the spherical body;
   reflecting the light signals from the inner surface of the spherical body;
   focusing the reflected light signals in the hollow space of the spherical body;
   generating a second air plasma from the focused light signals; and
   generating second terahertz waves when the second air plasma undergoes a reaction, and superposing the second terahertz waves on the first terahertz waves.

6. The method according to claim 5, further comprising, after the first terahertz waves and the second terahertz waves have been superposed:
   collimating the light signals in the hollow space of the spherical body;
   reflecting the light signals from the inner surface of the spherical body;

focusing the reflected light signals in the hollow space of the spherical body;

generating a third air plasma from the focused light signals; and generating third terahertz waves when the third air plasma undergoes a reaction, and superposing the third terahertz waves on the terahertz waves in which the first and second terahertz waves are superposed on each other.

7. The method according to claim 6, further comprising:

repeating collimation and focusing of the light signals in the hollow space of the spherical body, and reflection of the light signals from the inner surface of the spherical body, generating an N-th air plasma, generating N-th terahertz waves when the N-th air plasma undergoes a reaction, superposing the N-th terahertz waves on resulting terahertz waves in which terahertz waves which have been generated up to now are superposed on one another, and outputting finally superposed terahertz waves to the focusing lens or the opening.

8. The method according to claim 7, wherein a number of air plasmas generated in the hollow space of the spherical body is controlled by adjusting incidence angles of the light signals that are incident through the focusing lens or the opening.

9. The method according to claim 5, wherein:

the light signals are two light signals having a frequency of $\omega$ and a frequency of $2\omega$; and the light signal having the frequency of $2\omega$ is generated by Second Harmonic Generation (SHG) occurring when femtosecond laser light having a frequency of $\omega$ is applied to a beta-$BaB_2O_4$ (BBO) or a lithium triborate ($LiB_3O_5$ or LBO) crystal.

10. The method according to claim 6, wherein:

the light signals are two light signals having a frequency of $\omega$ and a frequency of $2\omega$; and the light signal having the frequency of $2\omega$ is generated by Second Harmonic Generation (SHG) occurring when femtosecond laser light having a frequency of $\omega$ is applied to a beta-$BaB_2O_4$ (BBO) or a lithium triborate ($LiB_3O_5$ or LBO) crystal.

11. The method according to claim 7, wherein:

the light signals are two light signals having a frequency of $\omega$ and a frequency of $2\omega$; and the light signal having the frequency of $2\omega$ is generated by Second Harmonic Generation (SHG) occurring when femtosecond laser light having a frequency of $\omega$ is applied to a beta-$BaB_2O_4$ (BBO) or a lithium triborate ($LiB_3O_5$ or LBO) crystal.

12. The method according to claim 8, wherein:

the light signals are two light signals having a frequency of $\omega$ and a frequency of $2\omega$; and the light signal having the frequency of $2\omega$ is generated by Second Harmonic Generation (SHG) occurring when femtosecond laser light having a frequency of $\omega$ is applied to a beta-$BaB_2O_4$ (BBO) or a lithium triborate ($LiB_3O_5$ or LBO) crystal.

* * * * *